No. 852,998. PATENTED MAY 7, 1907.
B. H. BRIDGERS.
AUTOMOBILE WHEEL.
APPLICATION FILED OCT. 17, 1906.
2 SHEETS—SHEET 1.
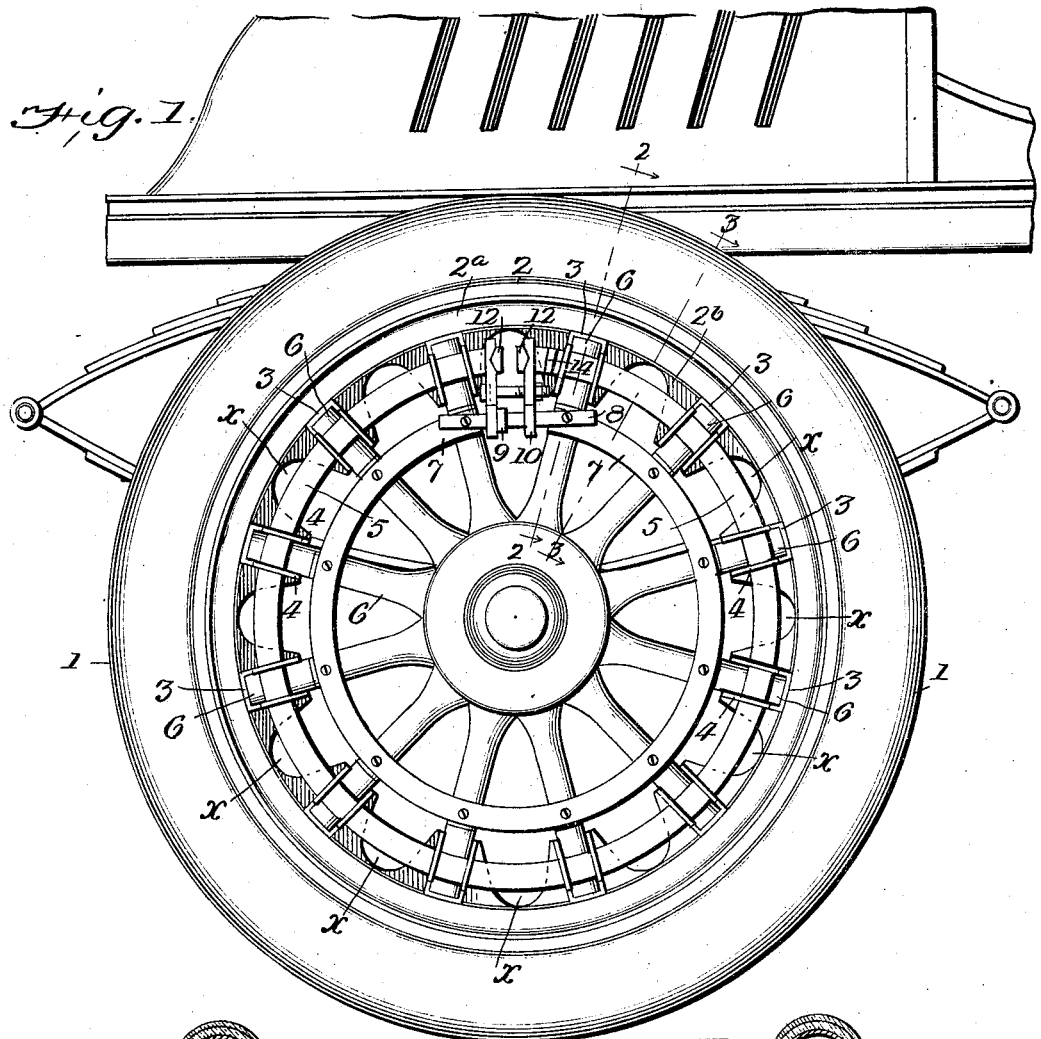
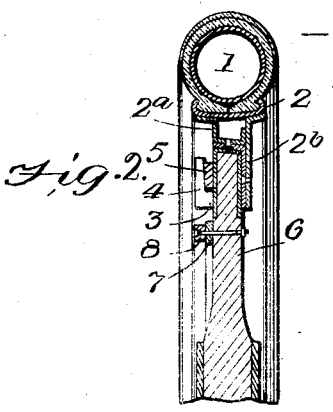
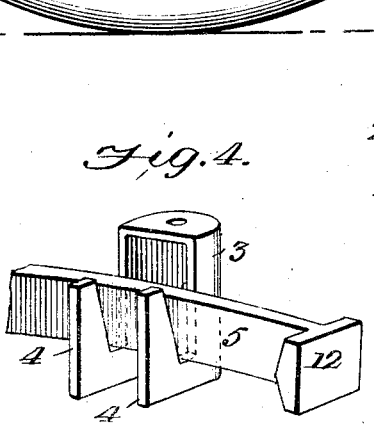
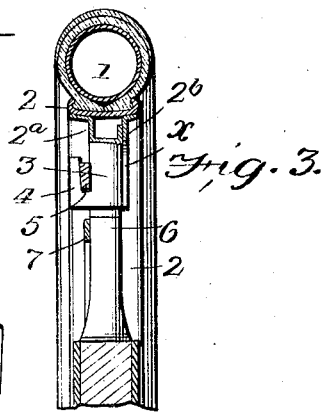
WITNESS
INVENTOR
BURKE H. BRIDGERS
BY
ATTORNEYS No. 852,998. PATENTED MAY 7, 1907.
B. H. BRIDGERS.
AUTOMOBILE WHEEL.
APPLICATION FILED OCT. 17, 1906.
2 SHEETS—SHEET 2.
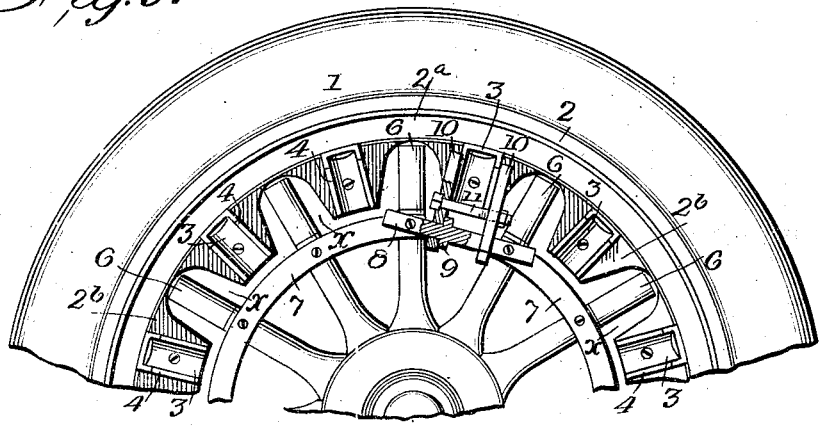
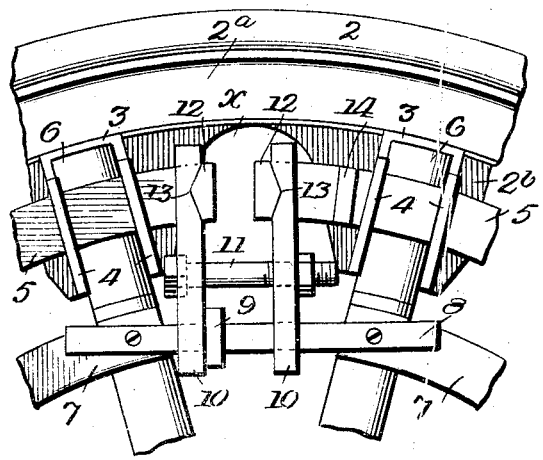
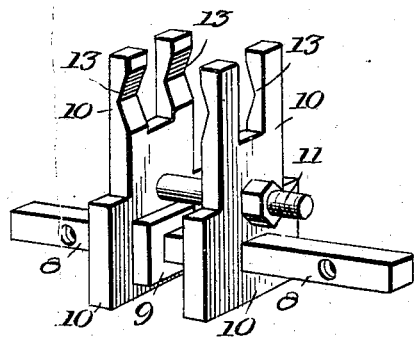
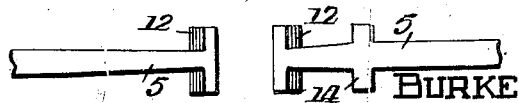
WITNESSES
INVENTOR
BURKE H. BRIDGERS
BY
ATTORNEYS

UNITED STATES PATENT OFFICE.

BURKE H. BRIDGERS, OF WILMINGTON, NORTH CAROLINA.

AUTOMOBILE-WHEEL.

No. 852,998.      Specification of Letters Patent.      Patented May 7, 1907.

Application filed October 17, 1906. Serial No. 339,363.

*To all whom it may concern:*

Be it known that I, BURKE H. BRIDGERS, a citizen of the United States, and a resident of Wilmington, in the county of New Hanover and State of North Carolina, have invented an Improvement in Automobile-Wheels, of which the following is a specification.

The difficulty of applying a solid or pneumatic rubber tire to the frame or skeleton of an automobile wheel is well known. I have devised a method and means whereby this operation may be effected expeditiously and with little labor.

In carrying out my invention, I make the ordinary metallic or wooden wheel rim, having an elastic tire secured thereto, detachable from the spokes of the wheel in place of the same being permanently secured thereto as in the usual construction. Thus, a rigid metallic or wooden wheel rim and an elastic tire secured to it, constitute together a single attachable and detachable member of the wheel.

My invention is embodied in the construction and combination of parts as hereinafter described and claimed, whereby such member, more especially the wheel rim, is held rigidly on the spoke ends when in use, but may be readily removed when necessary for repair or for substitution of a new elastic tire.

In the accompanying drawings, Figure 1 is a side view of an automobile wheel constructed according to my invention, the rim proper and elastic tire secured thereto being applied and fastened to the spoke ends. Fig. 2 is a transverse section on the line 2—2 of Fig. 1. Fig. 3 is a transverse section on the line 3—3 of Fig. 1. Fig. 4 is a perspective view of a spoke socket and a portion of the divided spring ring which engages the sockets and holds the spokes therein. Fig. 5 is a side view of a portion of the wheel, the spokes being shown in the spaces intermediate of the sockets as when the wheel rim and elastic tire are being removed therefrom. Fig. 6 is a side view of a portion of the wheel showing the means for straining the spoke-retaining ring by drawing its ends together or toward each other. Fig. 7 is a perspective view of the means for straining the spoke-retaining ring. Fig. 8 is a plan view of the juxtaposed ends of the spoke-retaining ring.

In Fig. 1, a wheel provided with a rim and elastic tire secured to the spokes according to my invention, is shown in connection with the front portion of an automobile of well known construction. The elastic pneumatic tire 1 is applied and secured to a rigid metallic wheel rim 2, in a well known way— see also Figs. 2 and 3. The wheel rim 2 is provided with a series of spoke sockets 3, which are open on one side and also provided with hooks or notched lugs 4 for receiving and holding a divided spring ring 5 that serves to confine the spoke ends 6 in the sockets.

The sockets are constructed of tough metal and in thimble form, save that one side is entirely open to adapt them to receive the spoke ends, as shown in Figs. 1, 2, 3 and 6. I propose to attach these sockets 3 to the metallic rim 2, in any suitable manner. In this instance, the ends and backs of the sockets are provided with holes for receiving screws which secure them to the inner annular portion $2^a$ of the wheel rim proper 2. As indicated in the drawing, the back of the portion $2^a$ is extended downward, as indicated at $2^b$, so as to form a firm lateral support for the sockets 3, but intermediately of the spokes, such portion $2^b$ is cut out as indicated at $x$, in Figs. 1, 5, and 6. As shown in Figs. 2 and 3, the ends of the spokes 6 and the heads or caps of the spoke sockets 3, are slightly inclined in place of being at right angles to the axes of the spokes. This is for the purpose of facilitating the application of the detachable member to the spokes and its removal therefrom and also to produce a tighter fit. The spokes are shown connected and braced by a ring 7, but this device may be dispensed with. This ring is not entire, but divided, its ends being separated by the distance between two spokes as shown in several figures. A bar 8 extends across the space and is secured to the two adjacent spokes by the same bolts that secure the ends of the brace 7. Upon this bar I mount the devices by which the retaining ring 5 is strained or drawn tightly in the lugs of the spoke sockets. The said bar 8 is provided with a collar 9, and it is rectangular in cross section as shown in Fig. 7. The ring-straining devices are forked metal plates 10, adapted to slide on the bar 8, and a bolt and nut 11, the bolt passing through the portions of said plates which are exterior to the bar 8. The ends of the divided spoke-retaining ring 5 are provided with enlarged heads 12, and the forked ends of the plates 10 are provided interiorly with notches 13 adapted to receive or engage such heads in the manner plainly shown in Fig. 6. By such construction, the members 10 and 12 are prevented from slipping on each other, in the operation of tightening the retaining ring 5. Let it be supposed that the spoke ends have been duly placed in the sockets 3 of the wheel rim 2, and that it is then desired to strain the ring so as to draw it inward and into firmer engagement with the outer or adjacent sides of the spokes. In such case, the plates 10 are slid into engagement with the heads 12 of the ring, and the nut is then tightened on the bolt 11, whereby the plates are drawn toward each other with corresponding force. One of the plates engages the collar or stop 9 on the bar 8, but the other is free to slide, as indicated in Fig. 6. By his means, the fastening whereby the spokes and rim are firmly engaged, is made complete.

It will be observed—see Figs. 2, 3, and 4—that the lugs or hooks 4 of the spoke sockets 3 are inclined toward the back of the socket on the inner side, the lower end of the incline being thus slightly nearer the back of the socket than the diameter of a spoke. Consequently, when the ring 5 is strained, or drawn tightly, it crowds in between the sloping sides of the lugs 4 and the adjacent or outer sides of the spokes, and the latter are in turn crowded firmly against the backs of the sockets 3. It is thus impossible for the spokes to move or become loose in the sockets, and consequently the entire wheel rim and tire are held as firmly as in the ordinary mode of attachment to spokes.

As previously stated, the ends of the spokes are sloped or slightly inclined—see Figs. 2 and 3—and the heads or tops of the spoke sockets 3 have a similar inclination. Hence, when the ring 5 is tightened as before described, the head of the spokes crowds inward against the correspondingly inclined heads of the sockets until the backs of the spoke ends are in contact with the backs of the socket. This construction is, however, particularly important in detaching the wheel rim and the attached elastic tire, since it enables the same to be readily pushed off laterally inward from the spokes after the retaining ring 5 has been removed. It is apparent, however, that when the rim has been thus pushed inward, and thus disengaged from the spoke ends, it cannot be removed from the axle and skeleton of the wheel without moving it circumferentially far enough to bring the spoke ends 6 into coincidence or registration with the vacant spaces $x$ formed in the inward extension $2^b$ of the rim. This is illustrated in Fig. 5, the retaining ring 5 having been detached and the spoke ends being shown in the spaces $x$ which permits the rim 2 with the elastic tire attached to be moved directly outward and away from the wheel. It is apparent that in placing a rim with a tire attached on the skeleton of the wheel, the operation is practically reversed.

For removing the retaining ring 5 from engagement with the spoke sockets, I employ in practice a tool specially constructed for the purpose, and I also provide one of the end portions of the ring with lateral lugs 14—see Figs. 6 and 8—with which such tool is adapted to engage. Such tool forms, however, no part of my present invention, and in practice, various means may be employed for the same purpose. It is understood that after the plates 10 have been loosened, so that they are practically released from the heads 12 of the retaining ring, the latter may easily spring out of the hooks of the spoke sockets.

While I have described my invention as particularly applicable to automobile wheels, it is, of course, adapted for a more general or wide application; that is to say, to bicycle and other wheels, and to pulleys.

I claim:

1. A wheel comprising a hub and spokes, and a rim which is detachable from the latter, and means for securing said rim to the spokes, the same consisting of sockets adapted for lateral reception of the spoke ends, hooks or lugs projecting laterally from the spoke sockets, a divided retaining ring adapted to engage the lugs, and a device for engaging and holding the ends of the divided ring, substantially as described.

2. A wheel comprising a hub and spokes, and a detachable rim having inwardly projecting sockets which are cut away on one side, a divided ring extending in front of the spokes and sockets, holding devices with which such ring engages, and means for straining the ring so as to hold it firmly in place, substantially as described.

3. A wheel comprising a hub and spokes, and a rim detachable therefrom, spoke sockets secured to and projecting inward from said rim, and provided with lateral extensions consisting of hooks or lugs, a spoke retaining ring adapted to engage the said hooks or lugs, and a straining device connected with the ends of the divided ring, substantially as described.

4. A wheel comprising a hub and spokes and a detachable rim having inwardly projecting sockets which are open on one side to adapt them to receive the spoke ends, lugs or hooks which are inclined on the inner side, the lower ends of the inclines being nearer the backs of the spoke sockets than the diameter of the spoke ends, a spoke-retaining ring adapted for engagement with the inclined sides of the lugs, and means for straining the ring so that it is crowded inward against the spokes, substantially as described.

5. A wheel comprising a hub and spokes, and a detachable rim having inwardly projecting spoke sockets which are open on one side, the portion of the rim intermediate of the sockets being cut away to a depth greater than the radial extensions of the spoke, to provide space for the latter in the operation of detaching the wheel rim, substantially as described.

6. A wheel rim having a series of sockets for receiving the ends of spokes, said sockets projecting radially inward, and being open on one side, a spoke-retaining ring and devices for engaging said spoke-retaining ring, substantially as described.

7. In a wheel a rim having an inwardly projecting flange, spoke sockets arranged on said flange and attached thereto, the same projecting radially inward and having one side cut away, and provided with lugs, substantially as described.

8. The combination, with a hub and spokes, of a rim which is detachable from the spoke ends, and provided with spoke-receiving sockets which are open on one side and provided with hooks or lugs, of a divided spoke-retaining ring provided with enlarged heads and adapted for engagement with said lugs, means for straining the ring for tightening it against the spokes, the same consisting of forked plates adapted to engage the heads of the ring, a bar on which the plates are arranged, one of them being adapted to slide thereon, and a straining bolt passing through the middle portion of the plates, substantially as described.

9. The combination with wheel spokes and a rim having spoke sockets provided with lateral projections having notches whose outer sides are inclined as described, of a divided ring adapted to engage said projections and wedge therewith, as shown and described.

10. The combination with wheel spokes and a rim provided with spoke sockets having lateral projections provided with notches, of a divided ring adapted to enter said notches, one of such engaging members having an inclined side whereby a wedging action results, as the ring is tightened, as described.

BURKE H. BRIDGERS.

Witnesses:
SOLON C. KEMON,
AMOS W. HART